Patented Oct. 12, 1954

2,691,600

UNITED STATES PATENT OFFICE 2,691,600

REGENERATED CELLULOSE CONTAINER CLOSURE

Almon V. Warren and Thomas J. Higgins, Jr., Fredericksburg, Va., assignors to American Viscose Corporation, Wilmington, Del., a corporation of Delaware No Drawing. Application January 31, 1950, Serial No. 141,606

16 Claims. (Cl. 106—166)

This invention relates to shrinkable regenerated cellulose container closures such as caps and bands and the like. More particularly, the invention relates to a regenerated cellulose bottle closure of novel appearance having a dull metallic-like finish or sheen.

Caps and bands may be made from viscose by dipping a suitably shaped mandrel into a viscose solution and after withdrawal of the mandrel, coagulating the viscose adhering to the same and then stripping the coagulated pellicle from the mandrel. Caps and bands may also be made by extruding the viscose solution through an annular orifice into a coagulating and/or regenerating bath and then subsequently treating the coagulated pellicle to purify the same. Wet regenerated cellulose shrinks when dried. Thus regenerated cellulose caps and bands are applied over the cork, or closure and neck of a bottle when wet and allowed to dry thereon. When dry, the cap or band forms an attractive and tightly fitting seal over the neck of the bottle.

It is also customary to incorporate various opaquing agents in the viscose to be formed into caps and bands. This not only hides the primary bottle closure but presents a satisfactory surface for printing the caps and bands. Further, various color combinations and effects are possible by the use of opaquing agents.

It is an object of the present invention to produce a regenerated cellulose container or bottle closure having a novel appearance. It is another object of the invention to produce caps and bands having a dull metallic-like finish or sheen. Other objects and advantages of the present invention will appear hereinafter.

The objects of the present invention are accomplished by adding to the viscose a suitable quantity of a dispersion, suspension, or emulsion comprised of finely ground glass, mica, and pigments. Such a viscose, when cast into a cap, band, pellicle, film, or the like, produces an article having a dull metallic-like finish. Articles so produced are suitable for printing and have an attractive appearance. These caps and bands give an antique or old look to bottles similar to dull finished metal closures and overcome the bright glossy finish of normal regenerated cellulose closures.

The particle size of the ground glass employed in this invention must be sufficiently small or fine so that the glass has a dulling effect. This is necessary and vital to produce the dull metallic finish or antique or old look in the band with which the invention is concerned. Ground glass of 150 to 200 mesh has been found to be satisfactory for this purpose when employed in conjunction with mica of 100 mesh. This particle size is absolutely necessary to produce the desired effect and the glass must be of a smaller particle size to kill the high degree of reflection or shine possessed by the mica surface. It is to be understood that the particle size of both the glass and mica may be varied to produce other desirable effects in the finished products.

When glass, of the particle size above indicated, alone is added to the viscose the resultant cap or band is too dull in appearance and when mica, of the size indicated above, alone is added the cap or band is too shiny for the purposes for which the present invention is intended. However, when both glass and mica, of the proper particle size, are added to the viscose, preferably in equal proportions, a pleasing and novel appearance is imparted to the cap or band extruded or cast therefrom, namely a dull metallic finish much like that of a cast metal surface having an extremely fine "tooth" or grain.

The glass, mica, and pigments, which may be of any desired color or combination of colors depending on the shade ultimately desired, are dispersed in water and the appropriate amount of such dispersion mixed with the viscose solution. Both the glass and mica in the dispersion may vary between 10 and 30%. However, equal proportions of each have been found to give the best results. The percentage of pigments employed may be varied to produce the desired intensity of color in the final product. Up to five percent total pigment (such as from 1 to 5%) has been found to be sufficient for all practical purposes. These percentages are all based on the amount of alpha cellulose in the viscose to which the dispersion is to be added.

The dispersion of the glass, mica, and pigments in water may vary in solids content between 20 and 40% but is preferably around 30%. From 5 to 15% by volume of such a slurry added to the viscose is sufficient.

By way of illustration the following examples are given. These compositions are representative of suitable dispersions that may be employed in the practice of the present invention but it should be understood that they are intended merely to be illustrative and not limitative.

Example I

The following were added to sufficient water with rapid stirring to give a dispersion of 32.2% solids. All percentages are based on the alpha cellulose content of the viscose to which the dispersion was added.

20% glass (150 to 200 mesh)
20% mica (100 mesh)
1.5% ferrite yellow pigment
0.1% oxide brown pigment (an iron oxide)

9.4% by volume of the 32.2% water dispersion was added to the viscose in conventional manner. The viscose was cast in conventional manner through an annular orifice and the tube thus formed cut into bands. The resultant bands had a dull yellowish brown metallic-like finish, and exhibited excellent printing properties.

*Example II*

Following the procedure of Example I, a 30.5% dispersion of the following was prepared.

20% glass (150 to 200 mesh)
20% mica (100 mesh)
3.0% titanium dioxide
0.01% carbon black 10.32% by volume of the above dispersion was added to a viscose solution and bands produced as in Example I. The resultant band had a dull gray metallic-like finish and exhibited excellent printing properties.

The dull metallic-like finish of the present invention is produced in a like manner in other non-fibrous pellicles such as casein, gelatin, alkali and water soluble cellulose ethers and esters, and the like.

One of the principal uses for the products of the present invention is in the secondary closing or sealing of bottles containing alcoholic liquors. The shrinkable container closures of this invention have improved appearance and an increased sphere of utility. The bottle caps and bands of this invention have an improved and novel external appearance and a covering power sufficient to hide the unsightly closure of the container to which applied. Further, the desirable dull metallic-like finish produced by the present invention is obtained without excessive loss of shrinking capacity of the cap or band and without impairing or preventing the further treatment or decoration thereof.

When caps or bands, such as those produced by means of the present invention, are employed on bottles containing alcoholic liquors and placed over the strip stamp to hold the same in place and to effectively seal the container, the cap or band will obscure a part of the stamp in violation of the Government regulations unless the cap or band is provided with a transparent section or sections through which the stamp will be visible at all times. This is accomplished by extruding tubing through a nozzle divided into four sections. Viscose containing glass, mica, and pigments is supplied to two opposite sections and transparent viscose is supplied to the other two sections. The alternate opaque and transparent viscose solutions are brought together and coagulated by passing them into a coagulating bath to form a continuous tubing having opposed transparent sections and opposed opaque sections having a dull metallic finish. While the cellulose content of the viscose solutions may be varied, it is preferably the same for both the transparent and opaque viscose.

It is to be understood that changes and variations may be made without departing from the spirit and scope of the invention as defined in the appended claims.

We claim:

1. As a new article of manufacture, a thin regenerated cellulose product containing 10 to 30 per cent finely ground glass and 10 to 30 per cent finely ground mica based on the weight of cellulose.

2. As a new article of manufacture, a thin regenerated cellulose product containing 10 to 30 per cent finely ground glass, 10 to 30 per cent finely ground mica and 1 to 5 per cent pigments based on the weight of cellulose.

3. As a new article of manufacture, a shrinkable regenerated cellulose container closure containing 10 to 30 per cent finely ground glass and 10 to 30 per cent finely ground mica based on the weight of cellulose.

4. As a new article of manufacture, a shinkable regenerated cellulose container closure containing 10 to 30 per cent finely ground glass, 10 to 30 per cent finely ground mica and 1 to 5 per cent pigments based on the weight of the cellulose.

5. A shrinkable regenerated cellulose container closure containing 10 to 30 per cent finely ground glass of 150 to 200 mesh, 10 to 30 per cent finely ground mica of 100 mesh and 1 to 5 per cent of pigments comprising a ferrite yellow pigment and an oxide brown pigment, said percentages being based on the weight of the cellulose.

6. A shrinkable regenerated cellulose container closure containing 10 to 30 per cent by weight finely ground glass of 150 to 200 mesh, 10 to 30 per cent by weight finely ground mica of 100 mesh and 1 to 5 per cent of pigments comprising titanium dioxide and carbon black, said percentages being based on the weight of the cellulose.

7. A composition of matter comprising viscose and dispersed therein, based on the weight of the cellulose in the viscose, 10 to 30 per cent finely ground glass and 10 to 30 per cent finely ground mica.

8. A composition of matter comprising viscose and dispersed therein, based on the weight of the cellulose in the viscose, 10 to 30 per cent finely ground glass and 10 to 30 per cent finely ground mica, the ground glass being sufficiently fine to produce a dulling effect.

9. A composition of matter comprising viscose and dispersed therein, based on the weight of the cellulose in the viscose, 10 to 30 per cent finely ground glass and 10 to 30 per cent finely ground mica, the glass having a smaller particle size than the mica.

10. A composition of matter comprising viscose and dispersed therein, based on the weight of the cellulose in the viscose, 10 to 30 per cent finely ground glass of 150 to 200 mesh and 10 to 30 per cent finely ground mica of 100 mesh.

11. A composition of matter comprising viscose and dispersed therein, based on the weight of the cellulose in the viscose, 10 to 30 per cent finely ground glass, 10 to 30 per cent finely ground mica and 1 to 5 per cent pigments.

12. A composition of matter comprising viscose and dispersed therein, based on the weight of cellulose in the viscose, 10 to 30 per cent finely ground glass, 10 to 30 per cent finely ground mica and 1 to 5 per cent pigments, the ground glass and mica being present in approximately equal proportions.

13. A composition of matter for producing shrinkable regenerated cellulose container closures comprising viscose and dispersed therein, based on the weight of the cellulose in the viscose, 20 per cent finely ground glass, 20 per cent finely ground mica, 1.5 per cent of a ferrite yellow pigment and 0.1 per cent of an oxide brown pigment.

14. A composition of matter for producing shrinkable regenerated cellulose container closures comprising viscose and dispersed therein, based on the weight of the cellulose in the viscose, 20 per cent finely ground glass of 150 to 200 mesh, 20 per cent finely ground mica of 100 mesh, 1.5 per cent of a ferrite yellow pigment and 0.1 per cent of an oxide brown pigment.

15. A composition of matter for producing shrinkable regenerated cellulose container closures comprising viscose and dispersed therein, based on the weight of cellulose in the viscose, 20 per cent finely ground glass, 20 per cent finely ground mica, 3 per cent titanium dioxide and 0.01 per cent carbon black.

16. A composition of matter for producing shrinkable regenerated cellulose container closures comprising viscose and dispersed therein, based on the weight of cellulose in the viscose, 20 per cent finely ground glass of 150 to 200 mesh, 20 per cent finely ground mica of 100 mesh, 3 per cent titanium dioxide and 0.01 per cent carbon black.

References Cited in the file of this patent

UNITED STATES PATENTS

| Number | Name | Date |
|---|---|---|
| 834,739 | Lilienfeld | Oct. 30, 1900 |
| 1,546,309 | Paisseau | July 14, 1925 |
| 2,041,143 | Olson | May 19, 1936 |
| 2,205,734 | Scherer | June 25, 1940 |
| 2,233,344 | Helm | Feb. 25, 1941 |

FOREIGN PATENTS

| Number | Country | Date |
|---|---|---|
| 193,583 | Switzerland | Oct. 31, 1937 |

OTHER REFERENCES

Heaton: "Outlines of Pain Technology" (1947), pages 135–6.